Figure 1:
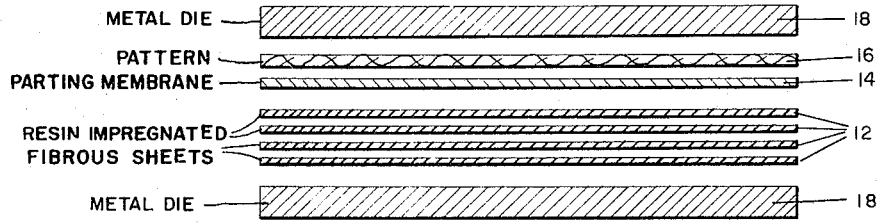

Feb. 7, 1967     J. MICHAELSON ET AL     3,303,081

METHOD FOR MAKING A TEXTURED LAMINATE SURFACE

Filed July 1, 1963

INVENTORS
JACK MICHAELSON
RICHARD C. McDEVITT
HERBERT I. SCHER

BY  KARL W. FLOCKS
ATTORNEY

United States Patent Office 3,303,081
Patented Feb. 7, 1967

3,303,081
METHOD FOR MAKING A TEXTURED LAMINATE SURFACE
Jack Michaelson, Baltimore, Richard C. McDevitt, College Park, and Herbert I. Scher, Baltimore, Md., assignors to National Plastic Products Co., Inc., Odenton, Md., a corporation of Maryland
Filed July 1, 1963, Ser. No. 291,959
8 Claims. (Cl. 156—219)

This invention relates to methods of forming negatively surfaced pressing plate dies utilized in the manufacture of textured three dimensional surfaced laminates.

Conventionally in the manufacture of laminated products consisting of resin impregnated sheets, it is usual to press a plurality or "book" of the impregnated sheets between steel plates under great heat and pressure. These plates are quite adequate for the production of smooth surfaced laminates. However, when it is desired to form laminates having a three dimensional surfaced configuration, the use of such steel dies becomes excessively expensive. Each pattern, and many may be desirable, must be etched or machined into a separate steel die.

It has been proposed to produce such dies out of other materials having the desired configuration, but these methods have not been entirely successful. The dies produced by some of these methods do not in turn produce satisfactory laminates. In addition, some of the dies do not lend themselves to effective and economical processing of the laminate products. Furthermore some of these methods have not been able to economically produce a plurality of die plates having exactly the same configuration.

It is therefore an object of the present invention to provide a method of economically making negatively surfaced pressing plate dies which obviate the above disadvantages.

It is another object of the present invention to provide pressing plate dies which are useful in the manufacture of high pressure decorative laminates with surfaces that contain three dimensional patterns or textures.

It is another object of the present invention to provide for the production of an infinite variety of new surfaces in a convenient and economical manner.

It is another object of the present invention to provide a method which can produce an indefinite number of pressing plate dies from a single use of an original pattern material.

It is another object of the present invention to prepare a large number of pressing dies with the identical surface configuration.

It is another object of the present invention to provide pressing plate dies having a negative and pattern producing configuration on both surfaces.

It is another object of the present invention to provide pressing plate dies which have the desirable characteristics of metal dies without their disadvantages.

Other objects and the nature and advantages of the instant invention will be apparent from the following description taken in conjunction with the accompanying drawings wherein:

FIGS. 1–5 show in section a schematic flow representation of the steps of the process of the present invention.

Figure 2:

FIG. 1 shows the formation of a negatively embossed plate 10 (shown completed in FIG. 2). A plurality of fibrous sheets 12, impregnated with a thermosetting resin such as a phenol formaldehyde resin, are assembled in a stack. On top of the stack of resin impregnated fibrous sheets is placed a parting membrane 14, which may be formed of any suitable material such as thin gauge aluminum foil. On top of this is placed a pattern producing sheet 16 which has the surface configuration desired in the ultimate product.

Any thermosetting resin may be used to impregnate the fibrous sheets in place of phenolic resin. Thus, for example, urea-formaldehyde resin, melamine-formaldehyde resin, epoxy resin, polyester resin or other common resins may be used.

The fibrous sheets may be formed of any desirable and well known materials such as paper, fabric, wood, woven glass, glass mats or asbestos. Kraft paper is the preferred fibrous sheet material.

The purpose of the parting membrane is to prevent the pattern producing sheet from becoming embedded in and/or adhering to the resin impregnated fibrous sheets as they are being cured. These membranes are also used in the later steps of the process for preventing any texture imparting sheet from becoming embedded in the phenolic layers being cured. These parting membranes should be thin enough to allow accurate transmission of the fine details of the texture or pattern, but must be sufficiently strong for removal from the plate or laminate without tearing. The parting membrane is preferably formed of aluminum foil of about 1 mil thickness, but may be any metal foil or silicone or polytetrafluoroethylene impregnated parchment paper. These materials are often reusable in the plurality of laminating operations.

The pattern producing sheet may be any material having a pattern which is desirable to reproduce in a laminate. Examples are woven fabrics such as lace, natural and synthetic sheet materials, wood veneer, leather, fiberglass mats, textured metal plates, ceramic tile, grooved wood paneling, etc.

After assembly, the stack of fibrous sheets 12, parting membrane 14 and pattern producing sheet 16 are then cured under heat and pressure between stainless steel dies 18 until a negatively embossed laminate plate 10 is produced. Plate 10 is removed from between dies 18 and parting membrane 14 and pattern producing sheet 16 are stripped away leaving surface 20 of plate 10 with a negative reproduction of the texture of the pattern producing sheet 16.

Figure 3:
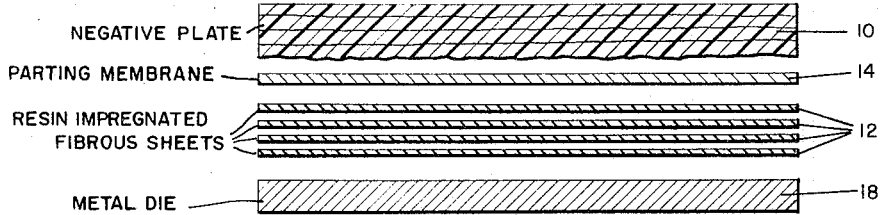

The negatively embossed plate 10 is shown in FIG. 3 as the upper die member for a second stack of resin impregnated fibrous sheets 12. Lying between die 10 and resin impregnated fibrous sheets 12 is another parting membrane 14. This assembly is cured under heat and pressure to effect lamination of the layers 12 and thereby produce a positive master 22.

Once again after stripping the parting membrane 14 from the positive master laminate 22, a positive reproduction surface 24 of the original pattern producing sheet remains on the positive master 22. The negatively embossed plate 10 may now be utilized to produce a plurality of positive masters 22 having exactly the same positive surface configuration 24. This would not be possible using the original pattern producing sheet 16 since that sheet is usually rendered unfit for further use by the first laminating operation and pattern producing sheets are rarely of uniform material, i.e., one sheet of fabric will not be identical in texture to another nor will one piece of wood veneer be identical to another.

Figure 4:
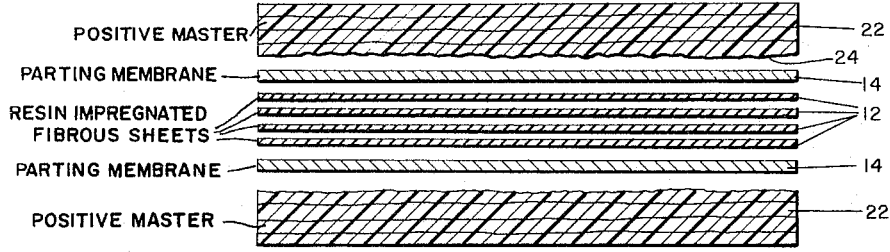
Figure 5:
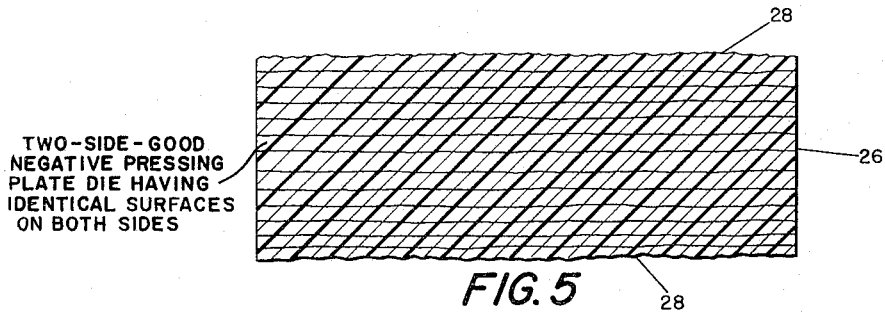

FIG. 4 shows the production of the final pressing plate die which is to be utilized in the manufacture of three dimensional surface laminates. As shown in FIG. 4 two positive masters 22 are used to squeeze resin impregnated fibrous sheets 12 and thereby produce a two-side-good pressing plate 26 having identical negative surfaces 28 on both surfaces. Most of the final negatively surfaced pressure plate dies 26 are preferably made with the desired texture on both surfaces so that conventional assemblies or "books" containing a number of laminates can be pressed simultaneously in each press operation. Only those pressing plates 26 used on the top and bottom laminates in plural "book" pressings would have the decorative texture on only one surface.

*Example 1*

A layer of woven fabric is placed over 15 sheets of phenolic resin impregnated kraft paper core sheets and is separated from the core sheets with a parting membrane of one mil aluminum foil. This assembly is placed between two metal plates such as 18 of FIG. 1 and cured for 50 minutes under 180° C. and 1600 lbs./sq. in. pressure. The phenolic impregnated sheets are consolidated in this process into a hard laminate in which the surface adjacent to the fabric is a negative reproduction of the texture of the fabric. This plate is then used to prepare a positive master in accordance with FIG. 3 following the aforementioned operating conditions. This phenolic master is then used to press one-side-good phenolic press plates.

The phenolic press plate having a negative surface is then used to prepare decorative laminates of conventional construction as is known in the art. This is accomplished by providing a conventional assembly of phenolic impregnated core paper, a melamine resin impregnated pattern sheet and a melamine resin impregnated overlay sheet stacked in that order. The resin impregnated sheets are then covered with a parting membrane and then with the negatively surfaced pressing plate die with its "fabric" surface facing downwardly against the parting membrane. This whole assembly is placed on a metal plate and cured under heat and pressure as is conventional. The finished laminate contains a positive reproduction of the fabric texture in its surface.

*Example 2*

The same process as carried out in Example 1 above is repeated except that a ceramic tile like surface is used in place of the woven fabric as the pattern producing sheet. In place of the one mil aluminum foil, a silicone impregnated parchment paper is utilized as the parting membrane. Instead of producing one positive master, two positive masters are produced instead and both are used to produce a two-side-good phenolic negatively surfaced pressing plate die. This die contains a negative reproduction of ceramic tile-like surface on both its sides and will produce a laminate very similar in appearance to mosaic ceramic tile surfaces.

*Example 3*

The process of Example 1 is again carried out except that in place of the fabric pattern sheet, a wood veneer is layed up in strips with approximately ⅛ of an inch longitudinal parallel spacing line between the strips; this is used as the pattern producing sheet. The resultant negatively surfaced pressing plate die not only incorporates the wood graining in its surface but also the raised parallel ridges with a random spacing. This plate is used to press a laminate which incorporates printed wood grain pattern sheet and which results in a finished product that looks and feels like natural wood paneling, but with the superior surface properties of a high pressure melamine surfaced laminate.

The process of the present invention enables the practical production of a wide variety of surfaces at negligible additional costs since the first plate made as outlined above can be used to reproduce a large number of phenolic plates. This procedure would have negligible costs compared to the use of photo-etched, electro-plated and polished metal plates. The present process provides that an indefinite number of pressing plates can be made with a single use of the original pattern material, be it cloth, veneer, etc. This improvement also allows the preparation of a large number of pressing plates with the identical surface. If a pattern had to be used for each plate preparation, no two plates would be exactly alike since the pattern is usually rendered unfit for further use by the operation and the patterns are rarely of uniform material.

It will be obvious to those skilled in the art that various changes may be made without departing from the scope of the invention and therefore the invention is not limited to what is shown in the drawings and described in the specification but only as indicated in the appended claims.

What is claimed is:
1. In the manufacture of pressing plate dies having molding surfaces which comprise a resin impregnated fibrous sheet for the production of three-dimensional surfaced laminates, the method of:
 (1) assemblying in a stack
  (a) a plurality of fibrous sheets impregnated with a thermosetting resin,
  (b) a pattern producing sheet, and
  (c) a thin parting layer interposed between (a) and (b);
 (2) applying sufficient heat and pressure to the assembly to effect a lamination of said fibrous sheets and produce a negatively embossed plate of said resin impregnated fibrous sheets;
 (3) removing the pattern producing sheet and the parting layer from the negative plate thereby providing said plate with a molding surface which comprises a resin impregnated fibrous sheet;
 (4) assembling in a stack
  (a) a plurality of fibrous sheets impregnated with thermosetting resin;
  (b) said negative plate of resin impregnated fibrous sheets, and
  (c) a thin parting layer therebetween;
 (5) applying heat and pressure to form a positive master and removing the negative plate and the parting layer therefrom to provide a positive master having a resin impregnated fibrous molding surface;
 (6) assembling in a stack
  (a) a plurality of fibrous sheets impregnated with thermosetting resin;
  (b) the postive master, and
  (c) a thin parting layer therebetween;
 (7) applying heat and pressure to form a negatively surfaced pressure plate die for the manufacture of three-dimensional surfaced laminates, and removing the positive master and the parting layer from said pressure plate die.

2. A method in accordance with claim 1 wherein said thermosetting resin is phenolic resin.

3. A method in accordance with claim 1 wherein said parting layer is aluminum foil.

4. A method in accordance with claim 3 wherein said aluminum foil is about 1 mil in thickness.

5. A method in accordance with claim 1 wherein said pattern producing sheet is a fabric sheet.

6. A method in accordance with claim 1 wherein in step (6) two positive masters are utilized, one on each side of the plurality of impregnated fibrous sheets, in order to produce a pressure plate die negatively surfaced on both sides.

7. A method in accordance with claim 1 wherein said parting layer comprises polytetrafluoroethylene.

8. A method in accordance with claim 1 wherein said pattern producing sheet is a wooden sheet.

References Cited by the Examiner
UNITED STATES PATENTS

| | | | |
|---|---|---|---|
| 2,606,855 | 8/1952 | Jenkins | 156—219 |
| 2,660,548 | 11/1953 | Soehner | 156—219 |
| 2,801,198 | 7/1957 | Morris et al. | 156—224 |
| 3,001,900 | 9/1961 | Frieder et al. | 220—83 |
| 3,137,609 | 6/1964 | Blaska | 156—209 |

EARL M. BERGERT, *Primary Examiner.*

H. F. EPSTEIN, *Assistant Examiner.*